US010333662B2

(12) United States Patent
Montreuil et al.

(10) Patent No.: US 10,333,662 B2
(45) Date of Patent: Jun. 25, 2019

(54) MULTIPLE USER (MU) SHORT FEEDBACK RESPONSE IN WIRELESS COMMUNICATIONS

(71) Applicant: Avago Technologies General IP (Singapore) Pte. Ltd, Singapore (SG)

(72) Inventors: Leo Montreuil, Atlanta, GA (US); Ron Porat, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 103 days.

(21) Appl. No.: 15/426,875

(22) Filed: Feb. 7, 2017

(65) Prior Publication Data
US 2017/0264403 A1 Sep. 14, 2017

Related U.S. Application Data

(60) Provisional application No. 62/305,461, filed on Mar. 8, 2016, provisional application No. 62/333,650, filed
(Continued)

(51) Int. Cl.
*H04L 5/00* (2006.01)
*H04B 7/0417* (2017.01)
*H04W 72/04* (2009.01)

(52) U.S. Cl.
CPC ........ *H04L 5/0007* (2013.01); *H04B 7/0421* (2013.01); *H04L 5/0037* (2013.01); *H04L 5/0053* (2013.01); *H04W 72/0446* (2013.01)

(58) Field of Classification Search
CPC ... H04B 7/0421; H04L 5/0007; H04L 5/0053; H04L 5/0037; H04W 72/0446
(Continued)

(56) References Cited

U.S. PATENT DOCUMENTS

2012/0057471 A1* 3/2012 Amini ................... H04W 24/04
370/242
2014/0126417 A1* 5/2014 Kang .................... H04W 8/005
370/254
(Continued)

FOREIGN PATENT DOCUMENTS

CN 104836757 A 8/2015

*Primary Examiner* — Phong La
(74) *Attorney, Agent, or Firm* — Garlick & Markison; Randy W. Lacasse

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. The WDEV generates a trigger frame that requests feedback responses from other WDEV(s) and transmit the trigger frame to the plurality of other WDEV(s). Then, in response to the trigger frame and based on agreed-upon parameters, the WDEV receives simultaneously the feedback responses that include a first feedback response from a first other WDEV and a second feedback response from a second other WDEV (e.g., within respective orthogonal frequency division multiple access (OFDMA) resource unit(s) (RU(s)) as specified by the agreed-upon parameters.

17 Claims, 9 Drawing Sheets

Related U.S. Application Data on May 9, 2016, provisional application No. 62/409,754, filed on Oct. 18, 2016, provisional application No. 62/452,189, filed on Jan. 30, 2017.

(58) Field of Classification Search
USPC .......................................................... 370/329
See application file for complete search history.

(56) References Cited

U.S. PATENT DOCUMENTS

| | | |
|---|---|---|
| 2015/0229505 A1 | 8/2015 | Porat et al. |
| 2016/0143026 A1* | 5/2016 | Seok ................. H04W 72/0413 370/329 |
| 2017/0070914 A1* | 3/2017 | Chun .................... H04L 1/0026 |
| 2017/0104563 A1* | 4/2017 | Lee ........................ H04L 5/0044 |
| 2017/0188390 A1* | 6/2017 | Adachi ................. H04L 5/0007 |
| 2017/0325239 A1* | 11/2017 | Xing ....................... H04W 4/06 |
| 2018/0110076 A1* | 4/2018 | Ko ........................... H04L 5/00 |

\* cited by examiner

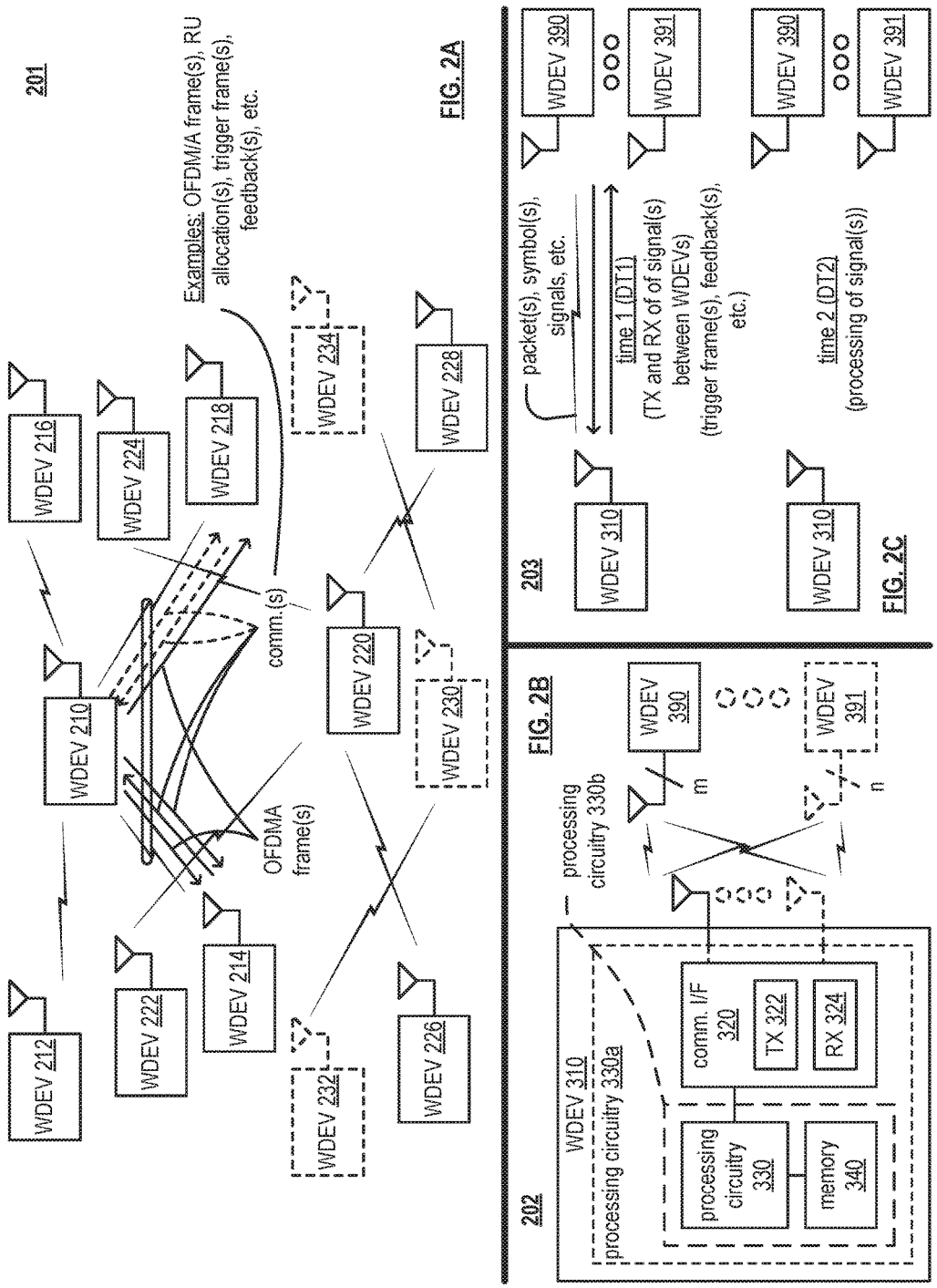

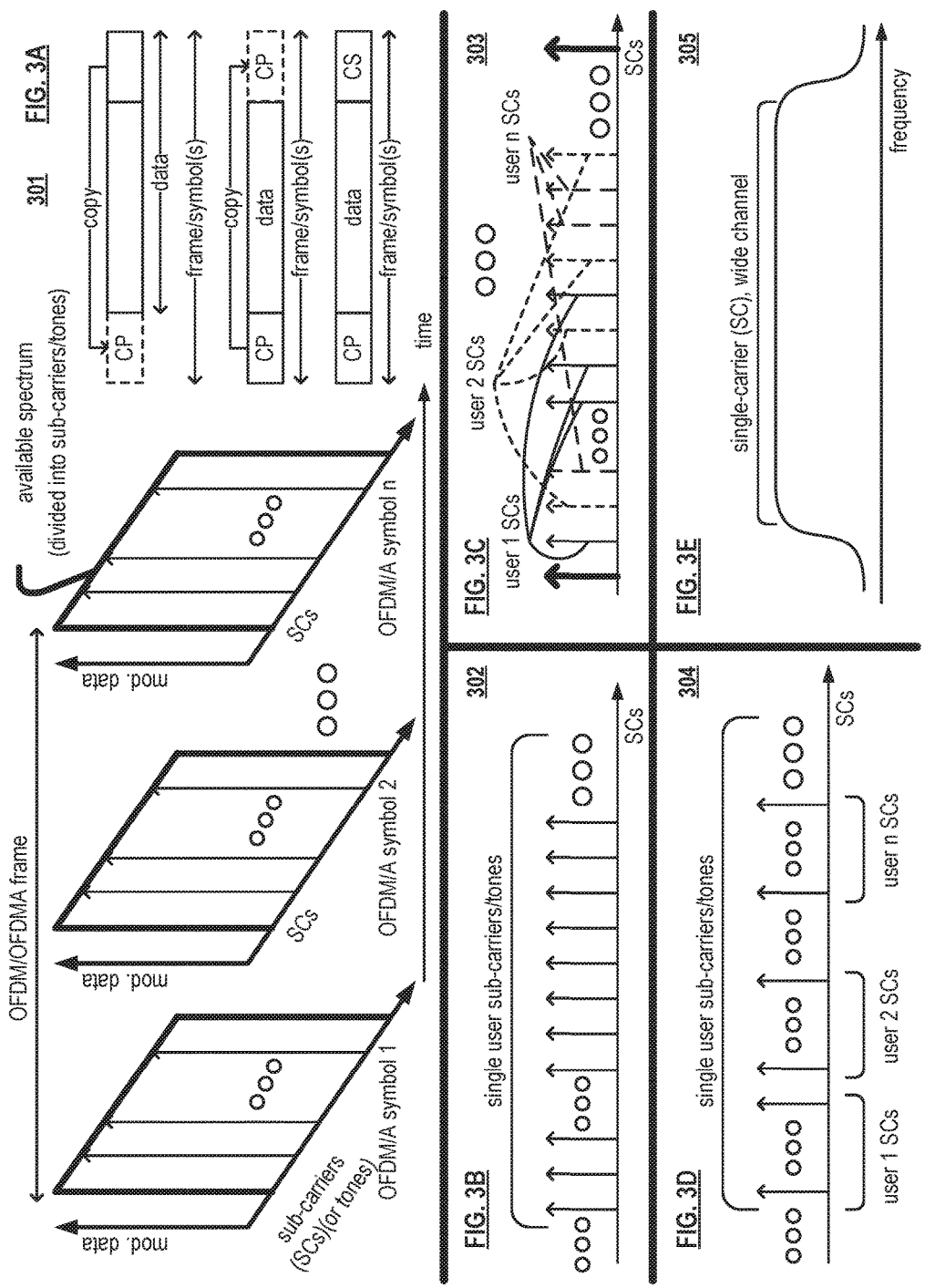

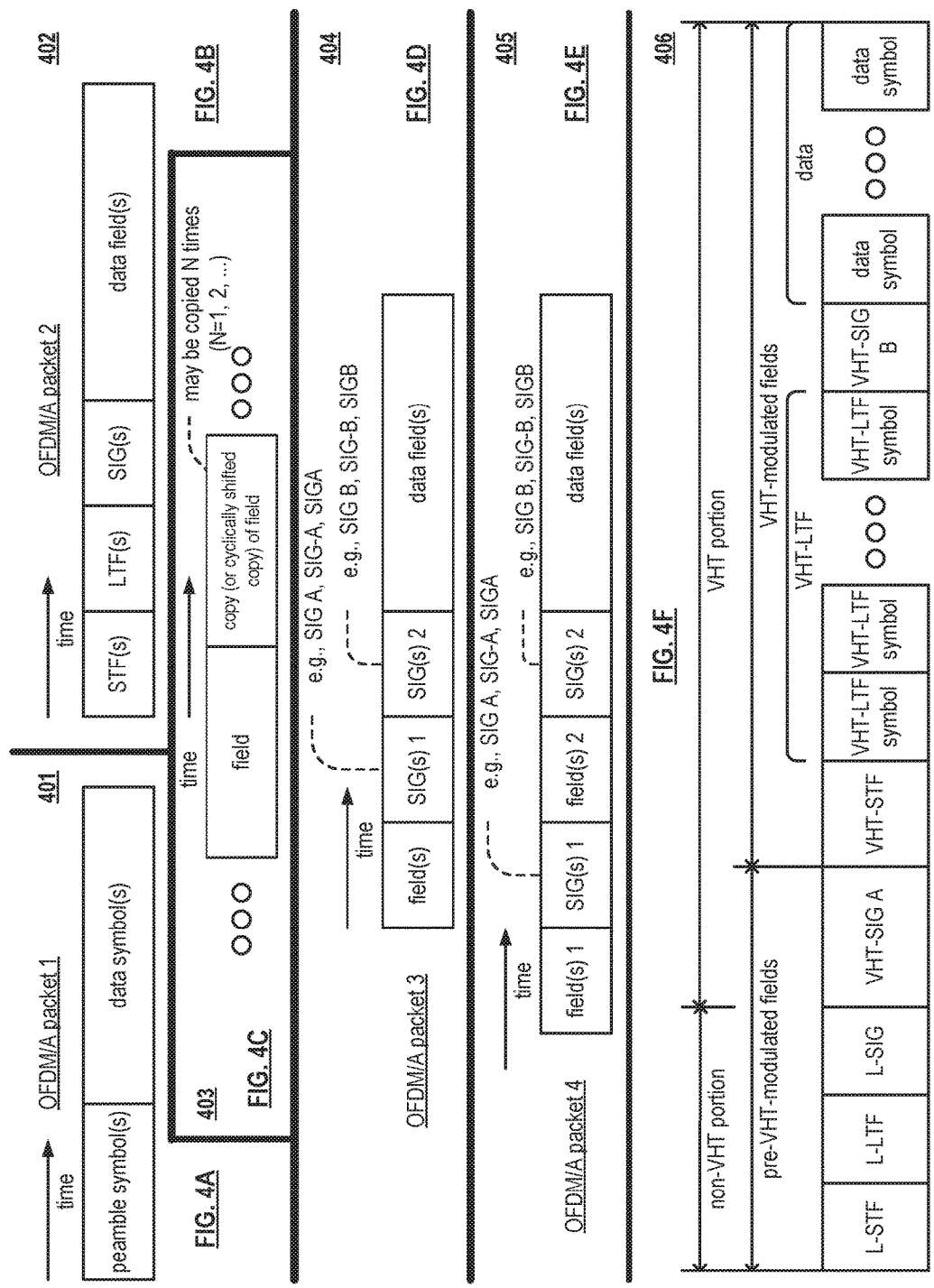

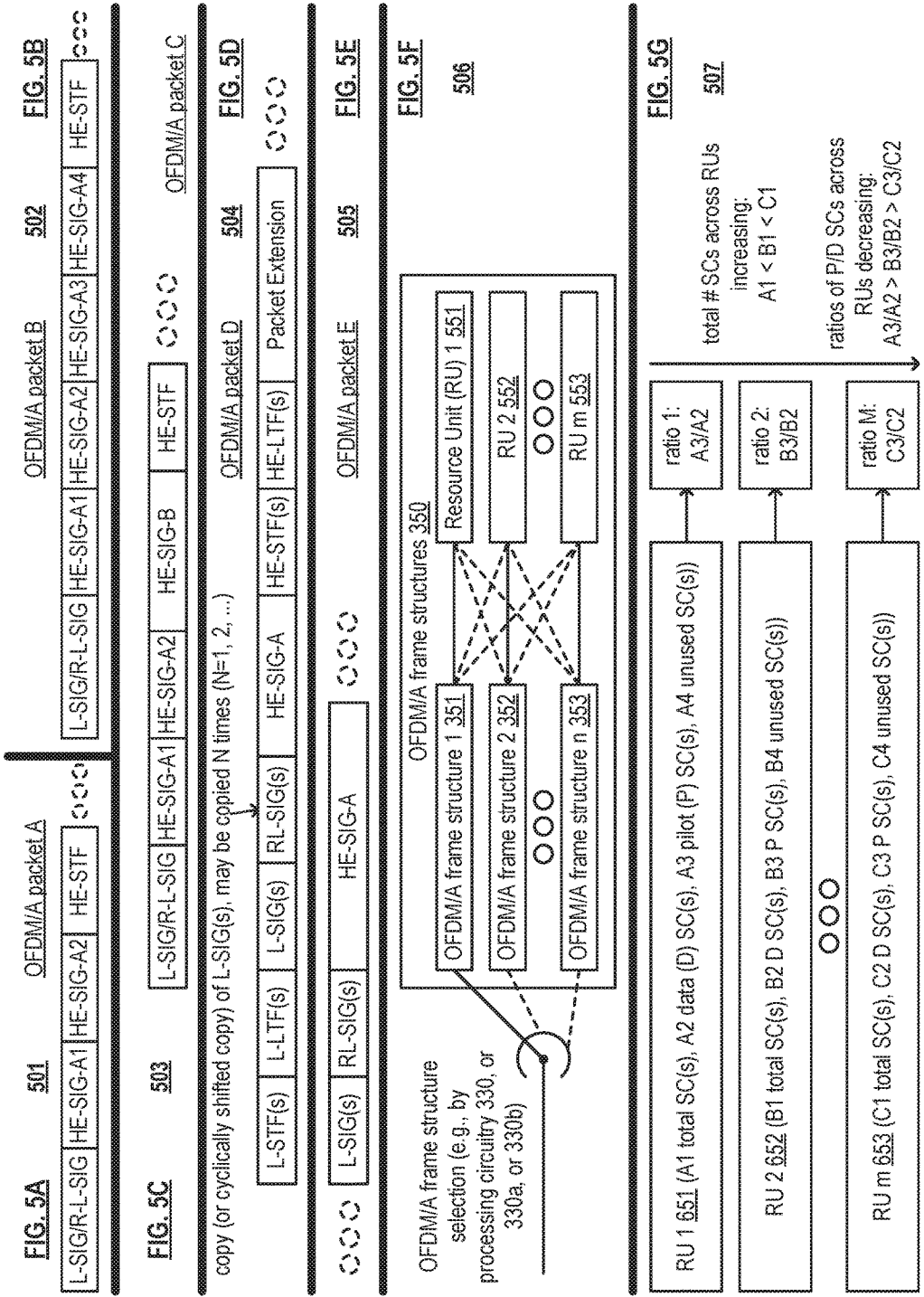

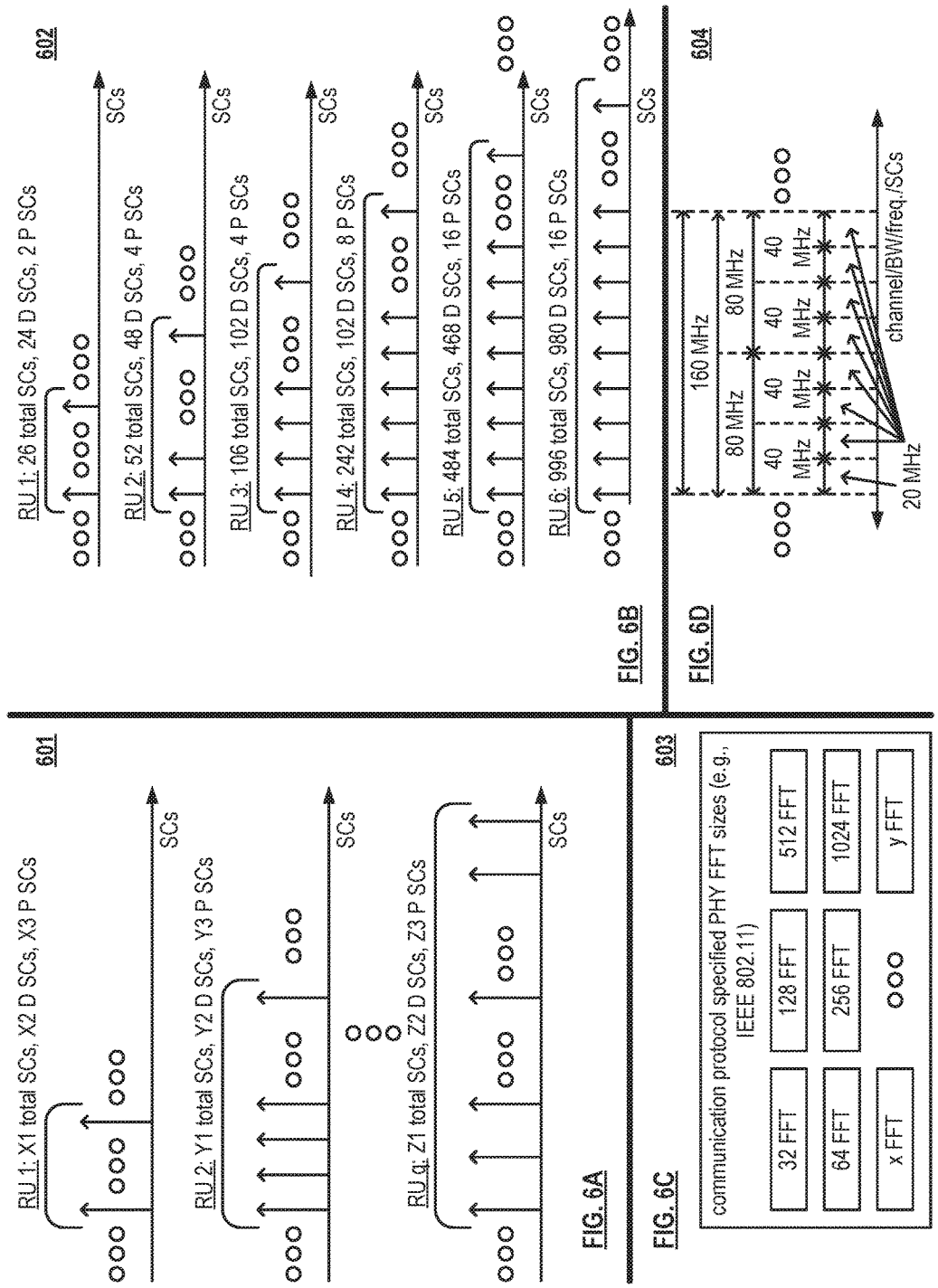

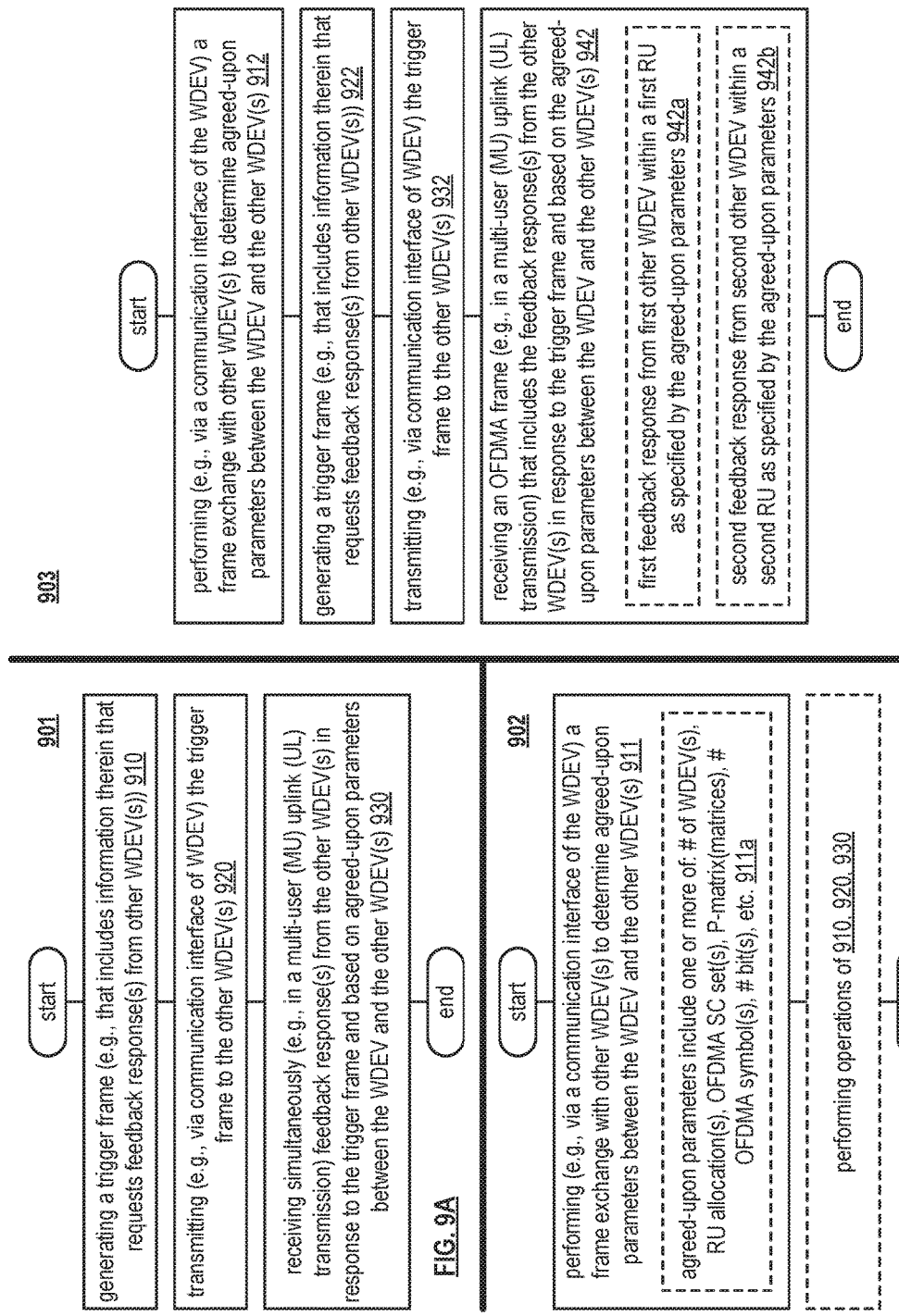

MULTIPLE USER (MU) SHORT FEEDBACK RESPONSE IN WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. § 119(e) to U.S. Provisional Application No. 62/305,461, entitled "Multiple user (MU) short feedback response in wireless communications," filed Mar. 8, 2016; U.S. Provisional Application No. 62/333,650, entitled "Multiple user (MU) short feedback response in wireless communications," filed May 9, 2016; U.S. Provisional Application No. 62/409,754, entitled "Multiple user (MU) short feedback response in wireless communications," filed Oct. 18, 2016; and U.S. Provisional Application No. 62/452,189, entitled "Multiple user (MU) short feedback response in wireless communications," filed Jan. 30, 2017, all of which are hereby incorporated herein by reference in their entirety and made part of the present U.S. Utility Patent Application for all purposes.

BACKGROUND

Technical Field

The present disclosure relates generally to communication systems; and, more particularly, to communications to and from wireless communication devices within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Various communications in wireless communications are performed for various purposes. Regardless of the reason for such communications, such communications consume available bandwidth and occupy the communication medium. The prior art does not provide acceptably effective means by which the communication medium can be used most effectively while maximizing access to all wireless communication devices within such wireless communication systems.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 5F is a diagram illustrating an example of selection among different OFDM/A frame structures for use in communications between wireless communication devices and specifically showing OFDM/A frame structures corresponding to one or more resource units (RUs).

FIG. 5G is a diagram illustrating an example of various types of different resource units (RUs).

FIG. 6A is a diagram illustrating another example of various types of different RUs.

FIG. 6B is a diagram illustrating another example of various types of different RUs.

FIG. 6C is a diagram illustrating an example of various types of communication protocol specified physical layer (PHY) fast Fourier transform (FFT) sizes.

FIG. 6D is a diagram illustrating an example of different channel bandwidths and relationship there between.

FIG. 9A is a diagram illustrating an embodiment of a method for execution by one or more wireless communication devices.

FIG. 9B is a diagram illustrating another embodiment of a method for execution by one or more wireless communication devices.

FIG. 9C is a diagram illustrating another embodiment of a method for execution by one or more wireless communication devices.

DETAILED DESCRIPTION

Figure 1:
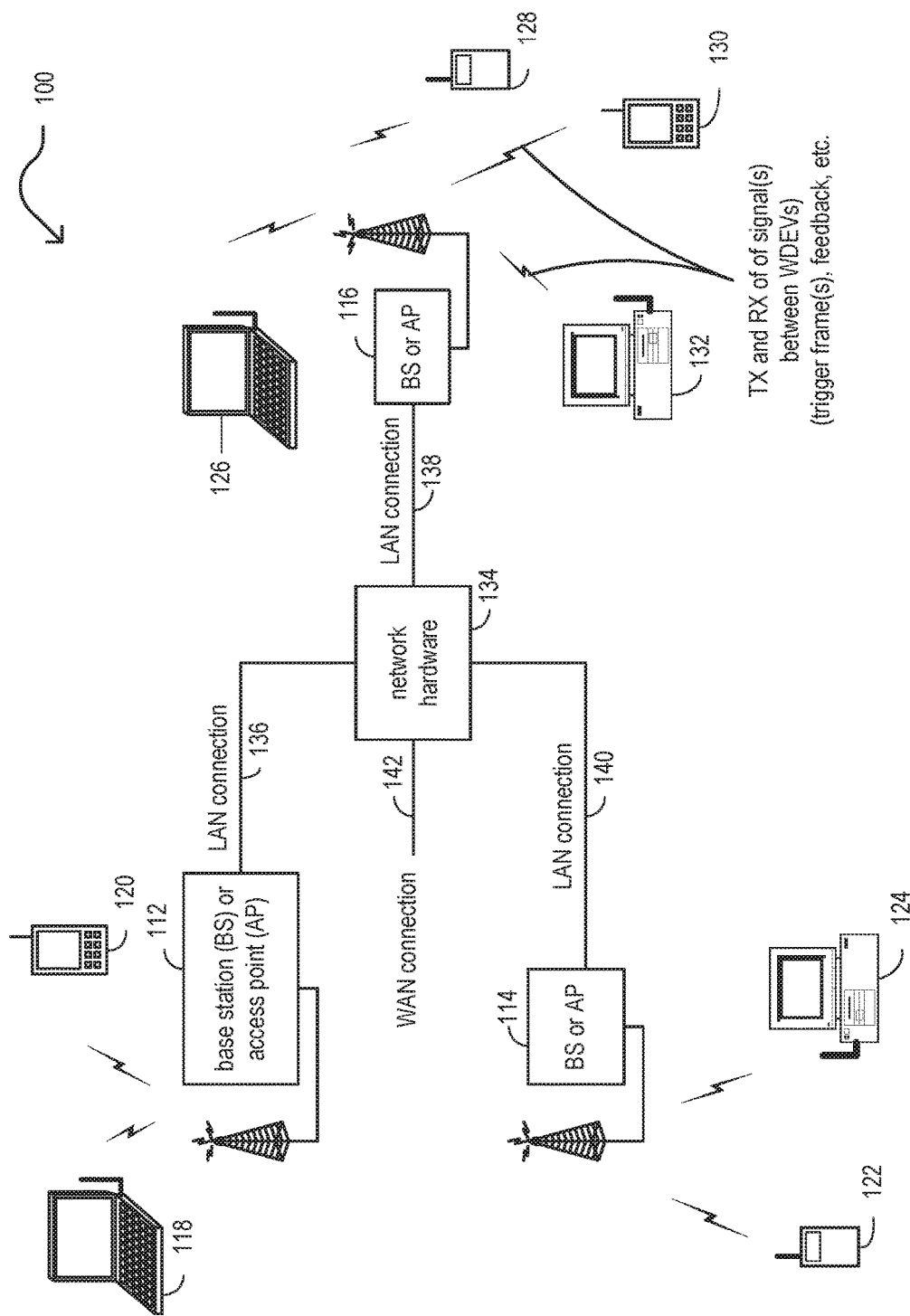
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes a processing circuitry to support communications with one or more of the other wireless communication devices (e.g., any other of the WDEVs 118-132 and BSs or APs 112-116). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 118-132 and BSs or APs 112-116) includes a processing circuitry and a communication interface configured to support communications with one or more of the other wireless communication devices (e.g., any other of the WDEVs 118-132 and BSs or APs 112-116).

In an example of operation and implementation, the BS/AP 116 supports communications with WDEVs 130, 132. The BS/AP 116 is configured to generate a trigger frame that requests feedback responses from the WDEVs 130, 132. The BS/AP 116 then is configured to transmit the trigger frame to the WDEVs 130, 132. Then, in response to the trigger frame and based on agreed-upon parameters between the BS/AP 116 and the WDEVs 130, 132, The BS/AP 116 is configured to receive simultaneously the feedback responses that include a first feedback response from WDEV 130 and a second feedback response from WDEV 132. For example, the first feedback response from the WDEV 130 can be included within a first orthogonal frequency division multiple access (OFDMA) resource unit (RU) as specified by the agreed-upon parameters, and the second feedback response from the WDEV 132 may be included within the first OFDMA RU or a second OFDMA RU as specified by the agreed-upon parameters.

In some examples, the agreed-upon parameters and the manner of communication between the BS/AP 116 and WDEVs 130, 132 allow for the WDEVs 130, 132 to provide feedback responses in a very short format and even using signals that exclude any preamble. For example, such feedback responses may be viewed as very short messages and are significantly shorter than typical message communicated in accordance with various communication standards, protocol, and/or recommended practices such as IEEE 801.11 and/or various amendments thereof. In a specific example, such a feedback response includes a message with no preamble whatsoever.

In general, and from certain perspectives, such operations are performed to effectuate the answering process of question. For example, BS/AP 116 considers to ask a question to WDEVs 130, 132. The WDEVs 130, 132 provide their respective responses by populating certain sub-carriers/tones with energy (e.g., based on the agreed-upon parameters). Such question(s)/answer(s) (Q(s)/A(s)) between the BS/AP 116 and WDEVs 130, 132 is based on a pre-defined Q(s)/A(s). In one example, the BS/AP 116 transmits a null data packet (NDP) to WDEVs 130, 132 and/or then transmits a trigger frame to the WDEVs 130, 132, and those WDEVs 130, 132 send feedback responses based on the trigger frame. Based on the agreed-upon parameters, both the BS/AP 116 and WDEVs 130, 132 know details such as how many bits are included in each feedback response, etc. Also, in some examples, note that the Q(s)/A(s) have relatively low-complexity (e.g., one situation being the BS/AP 116 soliciting yes/no responses from the WDEVs 130, 132). Because of this type of very efficient signaling, etc., note that the BS/AP 116 and WDEVs 130, 132 do not need to perform such feedback responses that include preambles and there is no need to perform additional operations such as channel estimation (CH-EST). The agreed-upon parameters ensure that the BS/AP 116 and WDEVs 130, 132 both know the Q(s) and the possible A(s) to that those Q(s), so that the communications may be effectuated very efficiently and effectively including some examples using feedback responses that exclude any preamble therein.

In some examples, the BS/AP 116 is configured to receive an orthogonal frequency division multiple access (OFDMA) frame that includes the first feedback response from WDEV 130 within the first OFDMA RU as specified by the agreed-upon parameters and the second feedback response from WDEV 132 within the first OFDMA RU or the second OFDMA RU as specified by the agreed-upon parameters.

Also, in even other examples, the BS/AP 116 is configured to determine that the first feedback response includes a first feedback response value (e.g., a yes value) from the WDEV 130 when the first feedback response includes energy on a first OFDMA sub-carrier set within the first OFDMA RU and substantially no energy on a second OFDMA sub-carrier set within the first OFDMA RU and to determine that the first feedback response includes a second feedback response value (e.g., a no value) from the WDEV 130 when the first feedback response includes substantially no energy on the first OFDMA sub-carrier set within the first OFDMA RU and substantially includes energy on the second OFDMA sub-carrier set within the first OFDMA RU.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation and implementation, the WDEV 210 supports communications with WDEVs 214, 218. The WDEV 210 is configured to generate a trigger frame that requests feedback responses from the WDEVs 214, 218. The WDEV 210 then is configured to transmit the trigger frame to the WDEVs 214, 218. Then, in response to the trigger frame and based on agreed-upon parameters between the WDEV 210 and the WDEVs 214, 218, The WDEV 210 is configured to receive simultaneously the feedback responses that include a first feedback response from WDEV 214 and a second feedback response from WDEV 218. For example, the first feedback response from the WDEV 214 can be included within a first orthogonal frequency division multiple access (OFDMA) resource unit (RU) as specified by the agreed-upon parameters, and the second feedback response from the WDEV 218 may be included within the first OFDMA RU or a second OFDMA RU as specified by the agreed-upon parameters.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, one processing circuitry 330b may be implemented to include the processing circuitry 330 and the memory 340 yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. In even other examples, the device 310 includes processing circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. In an example, at or during a first time (e.g., time 1 ($\Delta T1$)), the WDEV 310 transmits signal(s) to WDEV 390, and/or the WDEV 390 transmits other signal(s) to WDEV 310. At or during a second time (e.g., time 2 ($\Delta T2$)), the WDEV 310 processes signal(s) received from WDEV 390, and/or the WDEV 390 processes signal(s) received from WDEV 310.

In some examples, the signal(s) communicated between WDEV 310 and the WDEVs 390-391 may include orthogonal frequency division multiplexing (OFDM)/orthogonal frequency division multiple access (OFDMA) frame(s), trigger frame(s), response(s) and/or other information for use in supporting other communications between WDEV 310 and WDEVs 390-391.

In an example of implementation and operation, WDEV 310 generates and transmits a trigger frame to WDEVs 390-391. The respective WDEVs 390-391 transmit feedback responses to the trigger frame.

In a particular example, the WDEV 310 is configured to generate a trigger frame that requests feedback responses from a WDEVs 390, 391 and to transmit the trigger frame to the WDEVs 390, 391. Then, in response to the trigger frame and based on agreed-upon parameters between the WDEV 310 and the WDEVs 390, 391, the WDEV 310 is configured to receive (e.g., sometimes simultaneously) the feedback responses that include a first feedback response from a WDEV 390 within a first orthogonal frequency division multiple access (OFDMA) resource unit (RU) as specified by the agreed-upon parameters and a second feedback response from a WDEV 391 within the first OFDMA RU or a second OFDMA RU as specified by the agreed-upon parameters.

In some examples, the WDEV 310 is also configured to receive an OFDMA frame that includes the first feedback response from the WDEV 390 within the first OFDMA RU as specified by the agreed-upon parameters and the second feedback response from the WDEV 391 within the first OFDMA RU or the second OFDMA RU as specified by the agreed-upon parameters. In even other examples, the WDEV 310 is further configured to determine that the first feedback response includes a first feedback response value (e.g., a first predetermined response of any desired value, one specific example being a yes response) from the WDEV 390 when the first feedback response includes energy on a first OFDMA sub-carrier set within the first OFDMA RU and substantially no energy on a second OFDMA sub-carrier set within the first OFDMA RU and to determine that the first feedback response includes a second feedback response value (e.g., a second predetermined response of any desired value, one specific example being a no response) from the WDEV 390 when the first feedback response includes substantially no energy on the first OFDMA sub-carrier set within the first OFDMA RU and substantially includes energy on the second OFDMA sub-carrier set within the first OFDMA RU.

Also, in other examples, the WDEV 310 is further configured to perform, after receiving simultaneously the feedback responses, a frame exchange with the WDEVs 390, 391 to determine other agreed-upon parameters between the WDEV 310 and the WDEVs 390, 391. For example, different respective agreed-upon parameters between the WDEV 310 and the WDEVs 390, 391 may be made from time to time and based on any desired considerations. The, the WDEV 310 is further configured to generate another trigger frame that requests other feedback responses from the WDEVs 390, 391 and to transmit the another trigger frame to the WDEVs 390, 391. The WDEV 310 is further configured to perform simultaneously, in response to the another trigger frame and based the other agreed-upon parameters between the WDEV 310 and the WDEVs 390, 391, a third feedback response from the WDEV 390 within a third OFDMA RU as specified by the other agreed-upon parameters and a fourth feedback response from the WDEV 391 or a third other WDEV within the third OFDMA RU or a fourth OFDMA RU as specified by the other agreed-upon parameters.

In some particular examples, the first feedback response from the WDEV 390 includes a first number of bits (e.g., X bits where X is a positive integer), and the second feedback response from the WDEV 391 also includes the first number of bits. The third feedback response from the WDEV 390 includes a second number of bits that is different than the first number of bits (e.g., Y bits where Y is another positive integer different than X), and the fourth feedback response from the WDEV 391 or the third other WDEV includes the second number of bits.

In even other examples, before transmitting the trigger frame to the WDEVs 390, 391, the WDEV 310 is further configured to perform, a frame exchange with the WDEVs 390, 391 to determine the agreed-upon parameters between the WDEV 310 and the WDEVs 390, 391. Note that the agreed-upon parameters may include any one or more of a number of WDEVs within the WDEVs 390, 391 (e.g., 2 WDEVs, 3 WDEVs, 4 WDEVs, or more WDEVs), RU allocations to be used by the WDEVs 390, 391 including the first OFDMA RU to be used by the WDEV 390 and the second OFDMA RU to be used by the WDEV 391, a first OFDMA sub-carrier set within the first OFDMA RU to be used by the WDEV 390 to provide a first feedback response value and a second OFDMA carrier set within the first OFDMA RU to be used by the WDEV 390 to provide a second feedback response value, at least one P-matrix to be used by at least one of the WDEVs 390, 391 when transmitting at least one of the feedback responses to the WDEV 310, at least one number of OFDMA symbols to be used by the at least one of the WDEVs 390, 391 when transmitting the at least one of the feedback responses to the WDEV 310, and/or at least one of a number of bits to be included by the at least one of the WDEVs 390, 391 when transmitting the at least one of the feedback responses to the WDEV 310.

With respect to an example that allows WDEV 310 to decide the number of bits per response, the robustness (Nx) and the spreading number of spatial streams, Nss (e.g., as may be achieved using an appropriately selected P-matrix). For example, of WDEV 310 sends to WDEVs 390, 391 the following three parameters (e.g., for agreed-upon parameters) for the null data packet (NDP) short feedback response:

1. Nb=1, 2, 3 or 4 (number of bits in response)
2. Nx=1, 2, or 4 (number of symbols per 1 bit to transmit, control the robustness)
3. Nss=1, 2, or 4 (P-matrix size and number of OFDMA symbols); where Nb×Nx<=Nss Examples in 20 MHz may be as follows:

A. 9 STAs with 1b response, maximum efficiency (less robustness): Nb=1, Nx=1, Nss=1 (one OFDMA symbol)

B. 9 STAs with 1b response, minimum efficiency (more robustness): Nb=1, Nx=4, Nss=1 (four OFDMA symbols)

C. 9 STAs with 2b response, medium efficiency (moderate robustness): Nb=2, Nx=2, Nss=4 (four OFDMA symbols)

D. 18 STAs with 1b response, maximum efficiency (less robustness): Nb=1, Nx=1, Nss=2 (two OFDMA symbols)

E. 36 STAs with 1b response, maximum efficiency (less robustness): Nb=1, Nx=1, Nss=4 (four OFDMA symbols)

In the examples above, {D, E} are like a first Option #1 that uses a P-matrix for spreading (e.g., to add more users while keeping a same number of bits) and {C} is like an Option #2 (where a user is assigned a given set of sub-carriers, and a P-matrix is used to get more possible states, such as 1×1 P-matrix for 1 bit), 2×2 P-matrix for 2 bits, and 4×4 P-matrix for 3 or 4 bits, such as to add more bits per user).

With this novel scheme, NDP feedback response from a WDEV (WDEV 390 or WDEV 391) could be set to be always on a common set of 6 tones and to be within a single 26 tones RU. Response could range from 1 to 4 bits. In this novel scheme, the WDEV 310 decides the maximum Nss supported. For a given Nss, implementation is the same at AP whatever the multiples states are originating one or multiple STAs. The WDEV 310 can balance between robustness and maximum number of users.

An example of a P-matrix is an orthogonal matrix (e.g., $P_{2\times2}$=[top row [1 1], bottom row [1 −1]]). Different respective P-matrices of different sizes (e.g., 4×4, 6×6, 8×8, etc.) can be formed. For example, a 4×4 P-matrix can be formed such as by a combination of a 2×2 P-matrix and using conjugation methods. In some examples, a P-matrix may be viewed as being a complex square matrix with every principal minor greater than zero (0). In wireless communications, the use of a P-matrix can provide for spreading of respective sub-carriers to allow for more states across a given set of sub-carriers. For example, the use of a P-matrix can be used to perform spreading of signal to provide for allow for more bits in signaling that may be used for more users and/or more bits per user. As some examples, a 1×1 P-matrix would not provide for additional bits (e.g., result in just 1 bit), but a 2×2 P-matrix would provide for additional bits (e.g., result in 2 bits), and a 4×4 P-matrix would also provide for additional bits (e.g., result in 3 or 4 bits, as may be desired in different examples).

This disclosure presents, among other things, a novel signaling mechanism, scheme, protocol, approach, recommended practice, etc. for the multiple users (MUs) (e.g., multiusers) feedback such a trigger frame (e.g., such as a AP trigger frame from an AP, an AP-operative STA, such as the WDEV 310).

In one examples, feedback responses from the WDEVs 390-391 can include: Positive (YES), Negative (NO) or No response.

This disclosure shows various novel examples of short uplink (UL) feedback that may be used to improve efficiency and reduce latency.

In an example of implementation and operation including query and feedback, WDEV 310 generates and transmits an AP query downlink (DL) to WDEV 390 to determine if WDEV 390 has any information, data, etc. to be transmitted uplink (UL) to the WDEV 310 (e.g., WDEV 310 asks WDEV 390, the question: "Do you have something to send?"). The WDEV 390 responds with "YES" or "NO" by appropriate signaling based on the agree-upon parameters. In some instances, while the WDEV 390 transmits a response to WDEV 310, such a response may not be successfully received by the WDEV 310.

Various examples operate herein using novel signaling for the multiusers feedback (e.g., from WDEVs 390-391 to WDEV 310) from a trigger frame (e.g., feedback from WDEVs 390-391 to WDEV 310 such as in response to an AP trigger frame from WDEV 310). Examples of feedback responses: Positive (YES), Negative (NO).

Feedback Signaling:

In an example of implementation and operation, a response for one STA occupies one 26 tone RU [RU26] (e.g., see FIG. 6A-7C for examples of various sized resource units (RUs), channel bandwidths, etc.).

Such feedback signals can be implemented using 3 levels (e.g., −1, +1, and 0).

Considering an example where peak to average power ratio (PAPR) is 2.84 dB, 13 tones are BPSK modulated with a Barker sequence at +3 dB, such that 13 tones are nulls. Compensation of +3 dB may be used for 13 nulls tones per RU26. Note that this is not a power boosting.

Non-nulls and nulls tones are interleaved in frequency to minimize impairments from channel.

Examples of 3 possible responses on a 26 tones RU may be as follows:

Yes=[+1, 0, +1, 0, +1, 0, +1, 0, +1, 0, −1, 0, −1, 0, +1, 0, +1, 0, −1, 0, +1, 0, −1, 0, +1, 0]*sqrt(2);

No=[0, +1, 0, +1, 0, +1, 0, +1, 0, +1, 0, −1, 0, −1, 0, +1, 0, +1, 0, −1, 0, +1, 0, −1, 0, +1]*sqrt(2);

No response=[0, 0, 0, 0, 0, 0, 0, 0, 0, 0, 0, 0, 0, 0, 0, 0, 0, 0, 0, 0, 0, 0, 0, 0, 0, 0];

Note that channel estimation need not be required at a receiver (e.g., RX, STA).

The receiver (RX) processing can be of very low complexity such that there is no threshold adjustment and robust to interference. In some examples, if circular rotations of the Barker sequence and correlators are used at a receiver (RX), then up to 12 additional response types can be added. Note that various types of RU sizes may be allocated to WDEVs for use to make their feedback responses, various pattern(s) of sub-carriers of respective set(s) of sub-carriers within those RU(s), and different parameters may be used for the respective agreed-upon parameters that govern the communications between the wireless communication devices including the feedback response(s) used therein.

In other examples, two different options for sequence in the feedback response may be used: (1) Barker 13 sequence and/or (2) HE-LTF 2× sequence.

Also, two options for multiplexing the MU responses may be used: (1) orthogonal frequency division multiple access (OFDMA)/time division multiple access (TDMA) and/or (2) OFDMA/Spatial Stream (encoded using the P-Matrix).

A WDEV (e.g., WDEV 390, STA) that participates in a HE (High Efficiency) Trigger based PLCP Protocol Data Unit (PPDU) transmission may be implemented to have certain characteristics. Such operation may be based on section 22.3.12.4.6. Examples of such characteristics may include any one or more of: Timing accuracy of ±400 ns (800 ns p-to-p), carrier frequency offset (CFO) error with respect to the corresponding Trigger frame shall not exceed 350 Hz measured as the 10% point of complementary cumulative distribution function (CCDF) of CFO errors at a RX (receive) power of −60 dBm in a primary 20 MHz, absolute transmit (TX) power requirements and the received signal strength indicator (RSSI) measurement accuracy requirements for the two device classes (e.g., Class A: TX power accuracy: +/−3 dB, RSSI measurement accuracy: +/−3 dB, and a dynamic range of 6 dB; and Class B: TX power accuracy: +/−9 dB RSSI accuracy: +/−5 dB, and a dynamic range of 14 dB).

Certain examples of device feedback response from a receiver device (e.g., from a STA, a WDEV, etc.) are described below. A STA feedback response occupies one RU26 in frequency (e.g., where RU26 indicates a resource unit (RU) with 26 total sub-carriers such as with respect to FIG. 7B). Symbol time (excluding Cyclic prefix (CP)) is 12.8 micro-seconds (µs). Sequence is 13 tones per RU26 interleaved with 13 nulls tones (e.g., this can minimize the impairments from channel response). Sequence power is set to +3 dB to compensate for the 13 nulls tones (e.g., consider the total power for 26 tones RU remain the same). A transmitting device (e.g., AP, AP-operative STA, etc.) can operate to signal to the receiver devices (e.g., from STAs, WDEVs, etc.) the target RSSI level.

Examples of feedback response may be as follows:

1. "YES": a STA send a 13 tones sequence on RU26 at even tone indices (see Table 1) (e.g., note an exception is center RU26 where even on pos. and odd on neg. tone indices).

2. "NO": STA send a 13 tones sequence on RU26 at odd tone indices (see table 1) (e.g., note an exception is center RU26 where odd at pos. and even on neg. tone indices).

Note that the exception described above is because the center RU26 has 14 even and 12 odd tones. For better or best performance, an equal number of non-nulls to nulls tones is used.

TABLE 1

Sequence Tones Indices in 20 MHz

| | YES | NO |
|---|---|---|
| RU26 #1 | −120:2:−96 | −121:2:−95 |
| RU26 #2 | −94:2:−70 | −95:2:−71 |
| RU26 #3 | −68:2:−44 | −67:2:−43 |
| RU26 #4 | −42:2:−18 | −43:2:−17 |
| RU26 #5 | −15:2:−5, 4:2:16 | −16:2:−4, 5:2:15 |
| RU26 #6 | 18:2:42 | 17:2:41 |
| RU26 #7 | 44:2:68 | 43:2:67 |
| RU26 #8 | 70:2:94 | 71:2:95 |
| RU26 #9 | 96:2:120 | 97:2:121 |

Note:
Tone indices for 80 MHz follows the 20 MHz rule with an exception for center RU26.
Tone indices for 40 MHz follows the 20 MHz rule without the center RU26.

Signal Properties

Various signal properties are described below with respect to the operations described herein. Channel estimation is not required at the receiver (e.g., RX, where RX refers to receiver, STA, WDEV, etc.). RX process is trivial, so no threshold adjustment (e.g., compare the sum of power at EVEN with ODD tone locations).

Signal is robust to interference and channel response. Detection is unaffected by timing offset. Note that outdoor environment could introduce large timing offset. The timing error delta (Δ) for multiple STAs (e.g., 800 nano-seconds (ns)) with 120 m outdoor, results in 1.6 μs of timing offset. Note that this includes a 360° phase rotation across 8 adjacent sub-carriers based on a flat channel (e.g., flat frequency response).

A response includes an affirmative "YES" or "NO". Note that a "NO response" is not an implied "NO". Note that a "No response" from a STA could mean STA did not received the query, is out of range, or the AP did not decode properly the feedback response.

There may be interference prone environments where queries from AP or responses from STAs are missed. An AP can identify the STAs with "No response" and treat them accordingly. Note also that strong interference does not generate a large number of false "YES" or "NO" feedback responses.

In another example of implementation and operation, the WDEV 310 includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system. The processing circuitry is configured to transmit the first OFDMA packet and/or the second OFDMA packet to WDEV 390 and/or WDEV 391 via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots x_{N-Ncp}, \ldots, x_{N-1}$, where the $x_{N-Ncp}$ bit is the first bit of the end portion of the data portion that is to be copied, then the bits $x_{N-Ncp}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a and/or processing circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one of more first signal fields (SIG(s) 1) followed by one of more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one of more first signal fields (SIG(s) 1) followed by one or more second fields followed by one of more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 6D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 5F is a diagram illustrating an example 506 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 551. In another example, OFDM/A frame structure 1 351 is composed of at least one RU 1 551 and at least one RU 2 552. In another example, OFDM/A frame structure 1 351 is composed of at least one RU 1 551, at least one RU 2 552, and at least one RU m 553. Similarly, the OFDM/A frame structure 2 352 up through OFDM/A frame structure n 353 may be composed of any combinations of the various RUs (e.g., including any one or more RU selected from the RU 1 551 through RU m 553).

FIG. 5G is a diagram illustrating an example 507 of various types of different resource units (RUs). In this example 502, RU 1 551 includes A1 total sub-carrier(s), A2 data (D) sub-carrier(s), A3 pilot (P) sub-carrier(s), and A4 unused sub-carrier(s). RU 2 552 includes B1 total sub-carrier(s), B2 D sub-carrier(s), B3 P sub-carrier(s), and B4 unused sub-carrier(s). RU N 553 includes C1 total sub-carrier(s), C2 D sub-carrier(s), C3 P sub-carrier(s), and C4 unused sub-carrier(s).

Considering the various RUs (e.g., across RU 1 551 to RU N 553), the total number of sub-carriers across the RUs increases from RU 1 551 to RU N 553 (e.g., A1<B1<C1). Also, considering the various RUs (e.g., across RU 1 551 to RU N 553), the ratio of pilot sub-carriers to data sub-carriers across the RUs decreases from RU 1 551 to RU N 553 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT structures are multiplexed allowing up to 9 users with 242 sub-carriers–(9 users×26 RUs)=8 unused sub-carriers between the users. In yet another example, for 64 FFT users are multiplexed with 242 sub-carriers–(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

FIG. 6A is a diagram illustrating another example 601 of various types of different RUs. In this example 601, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 601, note that different RUs can include different spacing between the sub-carriers, different sub-carrier densities, implemented within different frequency bands, span different ranges within at least one frequency band, etc.

FIG. 6B is a diagram illustrating another example 602 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 242 total sub-carriers, which is 2× the 242 total sub-carriers of RU 4).

FIG. 6C is a diagram illustrating an example 603 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 6D is a diagram illustrating an example 604 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

Figures 7A, 7B, 7C:
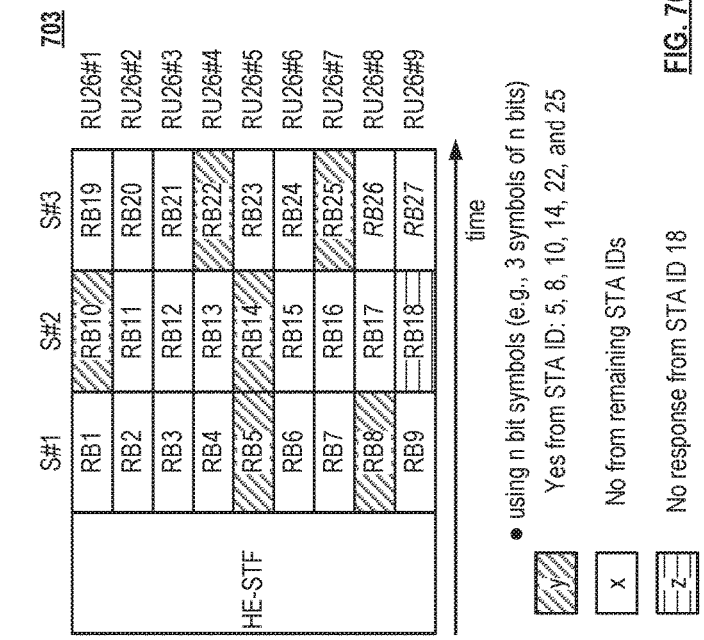
FIG. 7A is a diagram illustrating an example of OFDMA/TDMA feedback.
FIG. 7B is a diagram illustrating an example of a simulation of operation.
FIG. 7C is a diagram illustrating another example of OFDMA/TDMA feedback.

FIG. 7A is a diagram illustrating an example 701 of OFDMA/TDMA feedback. Time division multiple access (TDMA) (e.g., such that different symbols may be transmitted at different times, e.g., S#1, S#2, S#3) may be used in combination with orthogonal frequency division multiple access (OFDMA) (e.g., such as described with reference to FIG. 3A-3E). A response from a WDEV may be a combination of OFMA and TDMA. Feedback from N STA may be performed using a ceiling function, e.g., ceil(N/9) symbols in 20 MHz, ceil(N/36) symbols in 80 MHz.

Each STA may be uniquely assigned one RU26 (e.g., energy sent only on the assigned RU26). Such operation avoids collision, and this provides no issues with respect to near/far STA.

FIG. 7A shows an example of feedback from 25 users (e.g., 25 wireless stations (STAs), receivers, etc.). The feedback may be implemented using 3 symbols (e.g., −1, +1, and 0). This example shows receiving "YES" from STAs with IDs: 5, 8, 18, 22 and 25 (hashed), and "NO" from the remaining STA IDs (not hashed/solid).

FIG. 7B is a diagram illustrating an example 702 of a simulation of operation. A detection method, approach, etc. may be implemented as follows:

Detection method (3 outcomes): P1=sum(power in A locations), P0=sum(power in B locations), K=2; % decision scaling factor (P1>K·P0)→YES (P0>K·P1)→NO (not(YES) & not(NO))→No response In some examples, SNR may be calibrated for each 26 tones RU (e.g., per 2 MHz channel or sub-channel).

An alternate detection method, approach, etc. may be implemented as follows (for K=1):

Detection method (2 outcomes): P1=sum(power in A locations), P0=sum(power in B locations), K=1; % Scaling factor for decision (P1≥K·P0)→YES (P0>K·P1)→NO Sequence options: 1 and 2

Examples of different sequence options are described below.

1. Barker 13 sequence, PAPR is 2.84 or 3.90 dB (center RU26):

[+1, +1, +1, +1, +1, −1, −1, +1, +1, −1, +1, −1, +1];

2. HE-LTF 2× sequence (e.g., such as described in IEEE 802.11ax "11-15-1334-00-00ax-he-ltf-sequence-design" below), PAPRs is from 3.27 to 4.96 dB (center RU26):

"YES": All RU26 except center RU26, use same indices as HE-LTF 2×. Center RU26, remove tone at −16 and shift negative indices tones by −1 (see Table 1 above).

"NO": All RU26 except center RU26, use odd tone indices by shifting HE-LTF 2× sequence tone indices by +1 or −1. Center RU26, remove tone at +16 and shift positive indices tones by +1 (see Table 1 above).

Note: the probability of errors is same for both sequences. Note also that the Barker sequence has lower PAPR and cyclic shift of sequence (low cross-correlation) could be used to expand the number and type of response.

FIG. 7C is a diagram illustrating another example 703 of OFDMA/TDMA feedback. Time division multiple access (TDMA) (e.g., such that different symbols may be transmitted at different times, e.g., S#1, S#2, S#3) may be used in combination with orthogonal frequency division multiple access (OFDMA) (e.g., such as described with reference to FIG. 3A-3E). Note that MU responses may be based on OFDMA and TDMA.

A response from a WDEV may be a combination of OFMA and TDMA. Feedback from N STA may be performed using a ceiling function, e.g., ceil(N/9) symbols in 20 MHz, ceil(N/36) symbols in 80 MHz.

Each STA may be uniquely assigned one Resource Block (RB) consisting of one one RU26 (e.g., energy sent only on the assigned RU26). Such operation avoids collision, and this provides no issues with respect to near/far STA.

This example 703 of feedback from 25 users operates using 3 symbols (e.g., 3 symbols of N bits each). A "YES" from STA ID: 5, 8, 10, 14, 22 and 25. A "NO response" from STA ID: 18. A "NO" from the remaining STA IDs.

Figure 8:
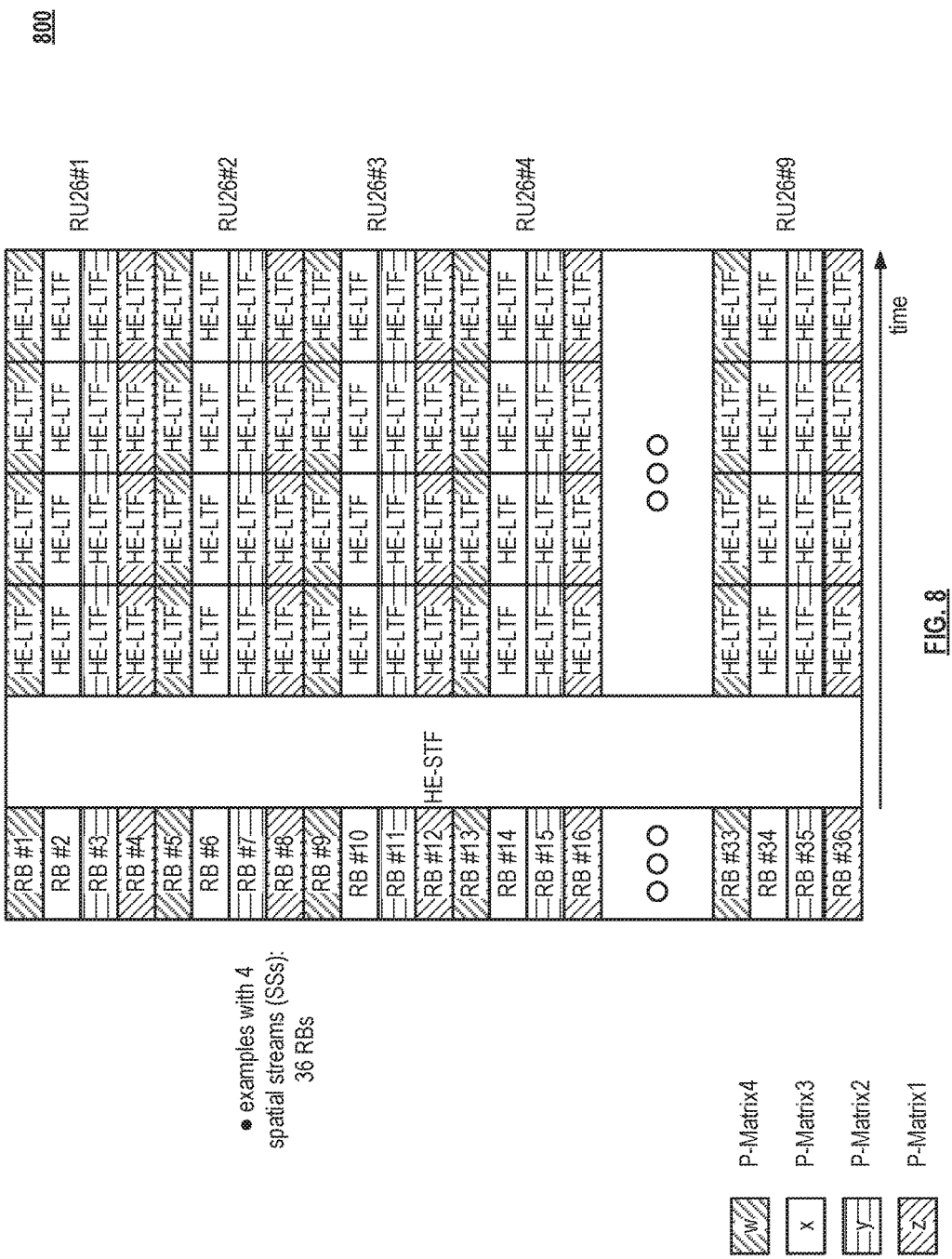
FIG. 8 is a diagram illustrating an example of OFDMA/spatial stream (SS) feedback.

FIG. 8 is a diagram illustrating an example 800 of OFDMA/spatial stream (SS) feedback. This diagram shows an option of multi-user (MU) based on orthogonal frequency division multiple access (OFDMA)/Spatial stream (SS) Feedback. Multiple user (MU) responses are OFDMA and orthogonal by encoding with the P-Matrix in the time direction. Each STA is uniquely assigned one Resource Block (RB) consisting of one orthogonal allocation on one RU26. This operates with no collisions.

This diagram shows an example of feedback for up to 36 users. This uses 4×4 P-Matrix. The sequence is HE-LTF 2× or Barker 13. A "YES" on RB #21: Sequence is sent on sub-carrier/tone indices [18:2:42], repeating for 4 symbols and encoded with P-Matrix row 1. A "NO" on RB #11: Sequence is sent on sub-carrier/tone indices [−67:2:−43], repeating for 4 symbols and encoded with P-Matrix row 3.

FIG. 9A is a diagram illustrating an embodiment of a method 901 for execution by one or more wireless communication devices. The method 901 begins in step 910 by generating a trigger frame that requests feedback responses from a plurality of other wireless communication devices. The method 901 continues in step 920 by transmitting (e.g., via a communication interface of the wireless communication device) the trigger frame to the plurality of other wireless communication devices. The method 901 then operates in step 930 by receiving simultaneously (e.g., via the communication interface of the wireless communication device in response to the trigger frame and based on agreed-upon parameters between the wireless communication device and the plurality of other wireless communication devices) the feedback responses that include a first feedback response from a first other wireless communication device within a first orthogonal frequency division multiple access (OFDMA) resource unit (RU) as specified by the agreed-upon parameters and a second feedback response from a second other wireless communication device within the first OFDMA RU or a second OFDMA RU as specified by the agreed-upon parameters.

FIG. 9B is a diagram illustrating another embodiment of a method 902 for execution by one or more wireless communication devices. The method 902 begins in step 911 by performing, before transmitting of a trigger frame to a plurality of other wireless communication devices, a frame exchange with the plurality of other wireless communication devices to determine the agreed-upon parameters between the wireless communication device and the plurality of other wireless communication devices.

As described in step 911a, such agreed-upon parameters may include any one or more of, in any combination, a number of wireless communication devices within the plurality of other wireless communication devices, RU allocations to be used by the plurality of other wireless communication devices including the first OFDMA RU to be used by the first other wireless communication device and the second OFDMA RU to be used by the second other wireless communication device, a first OFDMA sub-carrier set within the first OFDMA RU to be used by the first other wireless communication device to provide a first feedback response value and a second OFDMA carrier set within the first OFDMA RU to be used by the first other wireless communication device to provide a second feedback response value, at least one P-matrix to be used by at least one of the plurality of other wireless communication devices when transmitting at least one of the feedback responses to the wireless communication device, at least one number of OFDMA symbols to be used by the at least one of the plurality of other wireless communication devices when transmitting the at least one of the feedback responses to the wireless communication device, and/or at least one of a number of bits to be included by the at least one of the plurality of other wireless communication devices when transmitting the at least one of the feedback responses to the wireless communication device.

Then, in some examples, the method 902 then operates by performing the steps 910, 920, and 930 such as described with reference to the method 901 of FIG. 9A. For example, a frame exchange may be performed between a wireless communication device and a plurality of other wireless communication devices so that those wireless communication devices mutually know, agree, understand, etc. what the agreed-upon parameters are, what the response types and values correspond to, communication parameters to be used, etc.

FIG. 9C is a diagram illustrating another embodiment of a method 903 for execution by one or more wireless communication devices. The method 903 begins in step 912 by performing a frame exchange with a plurality of other wireless communication devices to determine agreed-upon parameters between the wireless communication device and the plurality of other wireless communication devices. The method 903 continues in step 922 by generating a trigger frame. In some examples, the trigger frame includes information that requests feedback responses from the plurality of other wireless communication devices. The method 903 then operates in step 932 by transmitting (e.g., via a communication interface of the wireless communication device) the trigger frame to the plurality of other wireless communication devices.

The method 903 continues in step 942 by receiving an orthogonal frequency division multiple access (OFDMA) frame, in response to the trigger frame and based on the agreed-upon parameters between the wireless communication device and the plurality of other wireless communication devices.

In some embodiments, as shown in step 942a, the feedback responses include a first feedback response from a first other wireless communication device within a first OFDMA resource unit (RU) as specified by the agreed-upon parameters. Also, in some embodiments, as shown in step 942b, the feedback responses also include a second other wireless communication device within the first OFDMA RU or a second OFDMA RU as specified by the agreed-upon parameters.

This disclosure presents, among other things, various examples where feedback includes 3 states: "YES", "NO" or "No response". In some examples, this is done by using 13 EVEN tones and 13 ODD tones in a 26 tones RU (or vice versa). Different sets of sub-carriers may be assigned within the RU. For example, one example includes 4 sub-carrier sets each having 6 sub-carriers.

This disclosure presents, among other things, various examples in which the number of response states is expanded. For example, an expansion from 3 to 6 response states is by using 4 set of 6 tones in a 26 tones RU. Short feedback can be used for other purpose than just a "YES" or "NO" response. In some examples, feedback could be an answer for a question having 2 (or more) corresponding possible answers.

Examples of such questions may include: (1) Does the wireless communication device have traffic in your queue for >20 mS, >100 mS? (3) How many bytes are buffered in the wireless communication device for transmission >1000 bytes, >5000 bytes? And (3) How many packets are buffered in the wireless communication device for transmission >5 packets, >15 packets?

In some examples, this disclosure also proposes to scale one measurement of an answer/feedback response and compare it to the other measurement of an answer/feedback response to declare is one state is true or not. This can eliminate any need of tracking the channel noise, measured at a different time, to adjust a threshold. This novel scheme is very robust to change in the channel conditions and interference.

Also, note that one RU26 (e.g., a resource unit (RU) with 26 sub-carriers/tones) could be subdivided in frequency to multiplex multiple wireless stations (STAs). This frequency division multiple access (FDMA) technique allow more STA per symbol in the feedback response.

In some specific examples, this disclosure presents that various examples include 4 sets of 6 sub-carriers/tones per RU26 (24 total out of 26 tones). For example, the two sets of 6 sub-carriers/tones are assigned to a first WDEV/STA #1 and the second set is assigned to a second WDEV/STA #2. With this technique, this disclosure proposes that a wireless communication device can signal a feedback response with an affirmative "YES" and "NO".

Another variation presented herein is to use set of tones for the channel noise background measurement that is common for multiple STAs in one RU26. For example, if an embodiment has four sets of 6 tones in an RU26. One set of 6 tones could be used as a channel noise background reference and the remaining three set could carry the feedback of 3 STAs. With this technique, one example has an affirmative "YES", the "NO" response is implied when the AP does not get a response.

Another variation is similar to just above but instead uses the whole 242 tones RU instead of single 26 tones RU. For example, this could be performed by subdividing the 242 tones RU in twenty-two sets of 11 tones. The 11 tones sequence could be a Barker sequence. This could operate by using one set of 11 tones spread across 20 MHz for the reference background channel noise and use the remaining twenty-one set of 11 tones to multiplex 21 STAs. With this technique, this could operate by having an affirmative "YES", the "NO" response is implied when the AP does not get a response. With this technique, this could operate by having up to 21 affirmative states.

Another variation is similar to just above but instead uses 2 states per STA to convey an affirmative "YES" and "NO". With the twenty-two sets of 11 tones, one set used as a reference noise, this could operate by multiplexing up to 10 STAs.

It is noted that while certain examples provided herein use the example of a certain number of sub-carriers within a given resource unit (RU) and/or a certain subset of sub-carriers within an RU on which energy is included to effectuate a given response (e.g., a first response such as a yes response when energy is included on a first subset of sub-carriers within the RU(s) or alternatively a second response such as a no response when energy is included on a second subset of sub-carriers within the RU(s)). Specifically, some examples may use a 13 sub-carrier set, others may use a 6 sub-carriers set, etc. In general, the various aspects, embodiments, and/or examples of the invention as presented herein may be applied and used in specific examples of any desired size.

In general, a communication channel may include any desired communication channel or sub-channel of a communication channel bandwidth size, desired number of RUs or any desired size, and any desired number of sub-carriers may be included within those one or more RUs (and different numbers of sub-carriers may be included in different RUs), and any desired first one or more sub-carriers may be used to effectuate a first response (e.g., a yes) and any desired second one or more sub-carriers may be used to effectuate a second response (e.g., a no), any desired P-matrix of any size and dimension may be used (or not used), any desired sequence of any desired type (e.g., such as a Barker sequence, or not used), any combination of used and unused sub-carriers within one or more RU(s), any combination of two or more RUs, any number of symbols, etc. and/or any other variations of the specific numbers and values of specific parameters as are used herein.

For example, while one specific example includes 4 sets of 6 sub-carriers each within a RU such as an RU with 26 sub-carriers. Note that the respective sets of 6 sub-carriers may be spread across a 20 MHz communication channel such that the respective sets of 6 sub-carriers are not composed respective or entirely of adjacently located or contiguous sub-carriers (e.g., having some similarities to the principles shown with respect to FIG. 3C with respect to different respective sets of sub-carriers assigned to different respective users). Also, within some example that operate based on different respective communication channels and/or sub-communication channels (e.g., such as 20 MHz, 40 MHz, 80 MHz, etc.), with respect to the sub-carriers located therein, some examples employ only sub-carriers that are common to the respective different respective communication channels and/or sub-communication channels. Some other examples used adjacent sub-carriers sets for different respective responses (e.g., a first sub-carrier set for a first response such as a yes response, and a second first sub-carrier set for a second response such as a no response). Also, some examples may operate not to use certain sub-carriers (e.g., unused sub-carriers) that are at specific locations (e.g., such as the −2 and +2 sub-carrier indices within each respective 20 MHz portion).

Another specific example includes 2 sets of 13 sub-carriers each within an RU such as an RU with 26 sub-carriers. In general, any alternative combination of sub-carriers within such an RU or 26 sub-carriers may be used without departing from the scope and spirit of the invention. Also, any one or more unused sub-carriers may be included in any specific example of various combinations or sets of sub-carriers within any one or more RUs. As some other examples considering an RU with 26 sub-carriers, there could be 8 sets of 3 sub-carriers each, 7 sets of 3 sub-carriers each, 6 sets of 4 sub-carriers each, 5 sets of 5 sub-carriers, 4 sets of 6 sub-carriers, 3 sets of 8 sub-carriers, 2 sets of 13 sub-carriers each, 2 sets of 12 sub-carriers each, etc. In general, any specific number of sets of sub-carriers and any desired specific numbers of sub-carriers maybe included in each respective set of sub-carriers. Note also that such principles may be extended to any other sized RU with any other number of sub-carriers.

It is also noted that the various operations and functions described within various methods herein may be performed within a wireless communication device (e.g., such as by the processing circuitry 330, communication interface 320, and memory 340 and/or processing circuitry 330a and/or processing circuitry 330b such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more submodules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
generate a trigger frame that requests feedback responses from a plurality of other wireless communication devices;
transmit the trigger frame to the plurality of other wireless communication devices;
receive simultaneously, in response to the trigger frame and based on agreed-upon parameters between the wireless communication device and the plurality of other wireless communication devices, the feedback responses that include a first feedback response from a first other wireless communication device within a first orthogonal frequency division multiple access (OFDMA) resource unit (RU) as specified by the agreed-upon parameters and a second feedback response from a second other wireless communication device within the first OFDMA RU or a second OFDMA RU as specified by the agreed-upon parameters; and
determine that the first feedback response includes a first feedback response value from the first other wireless communication device when the first feedback response includes energy on a first OFDMA sub-carrier set within the first OFDMA RU and substantially no energy on a second OFDMA sub-carrier set within the first OFDMA RU; and
determine that the first feedback response includes a second feedback response value from the first other wireless communication device when the first feedback response includes substantially no energy on the first OFDMA sub-carrier set within the first OFDMA RU and substantially includes energy on the second OFDMA sub-carrier set within the first OFDMA RU.

2. The wireless communication device of claim 1, wherein the processing circuitry is further configured to:
receive an OFDMA frame that includes the first feedback response from the first other wireless communication device within the first OFDMA RU as specified by the agreed-upon parameters and the second feedback response from the second other wireless communication device within the first OFDMA RU or the second OFDMA RU as specified by the agreed-upon parameters.

3. The wireless communication device of claim 1, wherein the processing circuitry is further configured to:
perform, after receiving simultaneously the feedback responses, a frame exchange with the plurality of other wireless communication devices to determine other agreed-upon parameters between the wireless communication device and the plurality of other wireless communication devices;
generate another trigger frame that requests other feedback responses from the plurality of other wireless communication devices;
transmit the another trigger frame to the plurality of other wireless communication devices; and
receive simultaneously, in response to the another trigger frame and based the other agreed-upon parameters between the wireless communication device and the plurality of other wireless communication devices, a third feedback response from the first other wireless communication device within a third OFDMA RU as specified by the other agreed-upon parameters and a fourth feedback response from the second other wireless communication device or a third other wireless communication device within the third OFDMA RU or a fourth OFDMA RU as specified by the other agreed-upon parameters.

4. The wireless communication device of claim 3, wherein:
the first feedback response from the first other wireless communication device includes a first number of bits;
the second feedback response from the second other wireless communication device includes the first number of bits;
the third feedback response from the first other wireless communication device includes a second number of bits that is different than the first number of bits; and
the fourth feedback response from the second other wireless communication device or the third other wireless communication device includes the second number of bits.

5. The wireless communication device of claim 1, wherein the processing circuitry is further configured to:
perform, before transmitting the trigger frame to the plurality of other wireless communication devices, a frame exchange with the plurality of other wireless communication devices to determine the agreed-upon parameters between the wireless communication device and the plurality of other wireless communication devices, wherein the agreed-upon parameters include at least one of:
a number of wireless communication devices within the plurality of other wireless communication devices;
RU allocations to be used by the plurality of other wireless communication devices including the first OFDMA RU to be used by the first other wireless communication device and the second OFDMA RU to be used by the second other wireless communication device;
a first OFDMA sub-carrier set within the first OFDMA RU to be used by the first other wireless communication device to provide a first feedback response value and a second OFDMA carrier set within the first OFDMA RU to be used by the first other wireless communication device to provide a second feedback response value;
at least one P-matrix to be used by at least one of the plurality of other wireless communication devices when transmitting at least one of the feedback responses to the wireless communication device;
at least one number of OFDMA symbols to be used by the at least one of the plurality of other wireless communication devices when transmitting the at least one of the feedback responses to the wireless communication device; or
at least one of a number of bits to be included by the at least one of the plurality of other wireless communication devices when transmitting the at least one of the feedback responses to the wireless communication device.

6. The wireless communication device of claim 1 further comprising:
the communication interface configured to support communications within at least one of a satellite communication system, a wireless communication system, a wired communication system, a fiber-optic communication system, or a mobile communication system.

7. The wireless communication device of claim 1 further comprising:
an access point (AP), wherein the plurality of other wireless communication devices includes a wireless station (STA).

8. A wireless communication device comprising:
a communication interface; and
processing circuitry that is coupled to the communication interface, wherein at least one of the communication interface or the processing circuitry configured to:
perform a frame exchange with a plurality of other wireless communication devices to determine agreed-upon parameters between the wireless communication device and the plurality of other wireless communication devices;
generate a trigger frame that requests feedback responses from the plurality of other wireless communication devices;
transmit the trigger frame to the plurality of other wireless communication devices;
receive an orthogonal frequency division multiple access (OFDMA) frame, in response to the trigger frame and based on the agreed-upon parameters between the wireless communication device and the plurality of other wireless communication devices, that includes the feedback responses that include a first feedback response from a first other wireless communication device within a first OFDMA resource unit (RU) as specified by the agreed-upon parameters and a second feedback response from a second other wireless communication device within the first OFDMA RU or a second OFDMA RU as specified by the agreed-upon parameters; and
determine that the first feedback response includes a first feedback response value from the first other wireless communication device when the first feedback response includes energy on a first OFDMA sub-carrier set within the first OFDMA RU and substantially no energy on a second OFDMA sub-carrier set within the first OFDMA RU; and
determine that the first feedback response includes a second feedback response value from the first other wireless communication device when the first feedback response includes substantially no energy on the first OFDMA sub-carrier set within the first OFDMA RU and substantially includes energy on the second OFDMA sub-carrier set within the first OFDMA RU.

9. The wireless communication device of claim 8, wherein the agreed-upon parameters include at least one of:
a number of wireless communication devices within the plurality of other wireless communication devices;
RU allocations to be used by the plurality of other wireless communication devices including the first OFDMA RU to be used by the first other wireless communication device and the second OFDMA RU to be used by the second other wireless communication device;
a first OFDMA sub-carrier set within the first OFDMA RU to be used by the first other wireless communication device to provide a first feedback response value and a second OFDMA carrier set within the first OFDMA RU to be used by the first other wireless communication device to provide a second feedback response value;
at least one P-matrix to be used by at least one of the plurality of other wireless communication devices when transmitting at least one of the feedback responses to the wireless communication device;
at least one number of OFDMA symbols to be used by the at least one of the plurality of other wireless communication devices when transmitting the at least one of the feedback responses to the wireless communication device; or
at least one of a number of bits to be included by the at least one of the plurality of other wireless communication devices when transmitting the at least one of the feedback responses to the wireless communication device.

10. The wireless communication device of claim 8 further comprising:
the communication interface configured to support communications within at least one of a satellite communication system, a wireless communication system, a wired communication system, a fiber-optic communication system, or a mobile communication system.

11. The wireless communication device of claim 8 further comprising:
an access point (AP), wherein the plurality of other wireless communication devices includes a wireless station (STA).

12. A method for execution by a wireless communication device, the method comprising:
generating a trigger frame that requests feedback responses from a plurality of other wireless communication devices;
transmitting, via a communication interface of the wireless communication device, the trigger frame to the plurality of other wireless communication devices;
receiving simultaneously, via the communication interface of the wireless communication device in response to the trigger frame and based on agreed-upon parameters between the wireless communication device and the plurality of other wireless communication devices, the feedback responses that include a first feedback response from a first other wireless communication device within a first orthogonal frequency division multiple access (OFDMA) resource unit (RU) as specified by the agreed-upon parameters and a second feedback response from a second other wireless communication device within the first OFDMA RU or a second OFDMA RU as specified by the agreed-upon parameters;
determining that the first feedback response includes a first feedback response value from the first other wireless communication device when the first feedback response includes energy on a first OFDMA sub-carrier set within the first OFDMA RU and substantially no energy on a second OFDMA sub-carrier set within the first OFDMA RU; and
determining that the first feedback response includes a second feedback response value from the first other wireless communication device when the first feedback response includes substantially no energy on the first OFDMA sub-carrier set within the first OFDMA RU and substantially includes energy on the second OFDMA sub-carrier set within the first OFDMA RU.

13. The method of claim 12 further comprising:

receiving, via the communication interface of the wireless communication device, an OFDMA frame that includes the first feedback response from the first other wireless communication device within the first OFDMA RU as specified by the agreed-upon parameters and the second feedback response from the second other wireless communication device within the first OFDMA RU or the second OFDMA RU as specified by the agreed-upon parameters.

14. The method of claim 12 further comprising:

performing, after receiving simultaneously the feedback responses, a frame exchange with the plurality of other wireless communication devices to determine other agreed-upon parameters between the wireless communication device and the plurality of other wireless communication devices;

generating another trigger frame that requests other feedback responses from the plurality of other wireless communication devices;

transmitting, via the communication interface of the wireless communication device, the another trigger frame to the plurality of other wireless communication devices; and receiving simultaneously, via the communication interface of the wireless communication device in response to the another trigger frame and based the other agreed-upon parameters between the wireless communication device and the plurality of other wireless communication devices, a third feedback response from the first other wireless communication device within a third OFDMA RU as specified by the other agreed-upon parameters and a fourth feedback response from the second other wireless communication device or a third other wireless communication device within the third OFDMA RU or a fourth OFDMA RU as specified by the other agreed-upon parameters.

15. The method of claim 12 further comprising:

performing, before transmitting the trigger frame to the plurality of other wireless communication devices, a frame exchange with the plurality of other wireless communication devices to determine the agreed-upon parameters between the wireless communication device and the plurality of other wireless communication devices, wherein the agreed-upon parameters include at least one of:

a number of wireless communication devices within the plurality of other wireless communication devices;

RU allocations to be used by the plurality of other wireless communication devices including the first OFDMA RU to be used by the first other wireless communication device and the second OFDMA RU to be used by the second other wireless communication device;

a first OFDMA sub-carrier set within the first OFDMA RU to be used by the first other wireless communication device to provide a first feedback response value and a second OFDMA carrier set within the first OFDMA RU to be used by the first other wireless communication device to provide a second feedback response value;

at least one P-matrix to be used by at least one of the plurality of other wireless communication devices when transmitting at least one of the feedback responses to the wireless communication device;

at least one number of OFDMA symbols to be used by the at least one of the plurality of other wireless communication devices when transmitting the at least one of the feedback responses to the wireless communication device; or at least one of a number of bits to be included by the at least one of the plurality of other wireless communication devices when transmitting the at least one of the feedback responses to the wireless communication device.

16. The method of claim 12 further comprising:

operating the communication interface of the wireless communication device to support communications within at least one of a satellite communication system, a wireless communication system, a wired communication system, a fiber-optic communication system, or a mobile communication system.

17. The method of claim 12, wherein the wireless communication device includes an access point (AP), and the plurality of other wireless communication devices includes a wireless station (STA).

* * * * *